United States Patent
Kim et al.

(10) Patent No.: US 8,984,629 B2
(45) Date of Patent: Mar. 17, 2015

(54) APPARATUS AND METHOD FOR PREEMPTIVELY PROTECTING AGAINST MALICIOUS CODE BY SELECTIVE VIRTUALIZATION

(75) Inventors: Kwang Tae Kim, Seoul (KR); Yongseok Hwang, Seoul (KR)

(73) Assignee: Ahnlab., Inc., Seoul (KR)

( * ) Notice: Subject to any disclaimer, the term of this patent is extended or adjusted under 35 U.S.C. 154(b) by 158 days.

(21) Appl. No.: 13/148,177

(22) PCT Filed: Feb. 3, 2010

(86) PCT No.: PCT/KR2010/000650
§ 371 (c)(1),
(2), (4) Date: Aug. 5, 2011

(87) PCT Pub. No.: WO2010/090435
PCT Pub. Date: Aug. 12, 2010

(65) Prior Publication Data
US 2011/0296526 A1 Dec. 1, 2011

(30) Foreign Application Priority Data

Feb. 5, 2009 (KR) .................. 10-2009-0009175

(51) Int. Cl.
*G06F 21/00* (2013.01)
*G06F 21/53* (2013.01)
(Continued)

(52) U.S. Cl.
CPC ............. *G06F 21/53* (2013.01); *H04L 63/1441* (2013.01); *G06F 21/55* (2013.01); *G06F 21/50* (2013.01)
USPC ................. 726/22; 726/23; 726/24; 713/188; 713/164; 713/165; 713/167

(58) Field of Classification Search
CPC ...... H04L 63/1441; G06F 21/53; G06F 21/55
USPC .......... 726/22, 23, 24; 713/164, 165, 167, 188
See application file for complete search history.

(56) References Cited

U.S. PATENT DOCUMENTS 7,231,665 B1 * 6/2007 McArdle et al. ................. 726/22
7,428,701 B1 * 9/2008 Gavin et al. .................... 715/243
(Continued)

FOREIGN PATENT DOCUMENTS

KR 1020070027383 3/2007
KR 1020070067614 6/2007
(Continued)

OTHER PUBLICATIONS

Payne, Bryan D.; Carbone, Martim; Sharif, Monirul; Lee, Wenke; "Lares: An Architecture for Secure Active Monitoring Using Virtualization", IEEE Symposium on Security and Privacy, May 18-22, 2008, pp. 233-247.*

(Continued)

*Primary Examiner* — Victor Lesniewski
(74) *Attorney, Agent, or Firm* — Bacon & Thomas, PLLC

(57) ABSTRACT

In an apparatus and method for protecting resources of a computing system from a malicious code by selective virtualization, at least a part of the resources is classified as compulsory resources for executing a program on the computing system. When a vulnerable program executed in a separate space attempts to access one of the compulsory resources, an operating system level virtualization is performed. Further, when the vulnerable program attempts to access one of the resources of the computing system which is other than the compulsory resources, the vulnerable program is permitted to access a modified resource which is generated by modifying content of the resource.

20 Claims, 4 Drawing Sheets

(51) Int. Cl.
*H04L 29/06* (2006.01)
*G06F 21/55* (2013.01)
*G06F 21/50* (2013.01)

(56) References Cited

U.S. PATENT DOCUMENTS

| | | | |
|---|---|---|---|
| 7,536,635 B2* | 5/2009 | Racovolis et al. | 715/229 |
| 7,613,930 B2* | 11/2009 | Dotan | 713/188 |
| 7,640,583 B1* | 12/2009 | Marinescu et al. | 726/22 |
| 7,712,029 B2* | 5/2010 | Ferreira et al. | 715/256 |
| 7,849,360 B2* | 12/2010 | Largman et al. | 714/13 |
| 7,954,092 B2 | 5/2011 | Sharma et al. | |
| 7,984,514 B1* | 7/2011 | Meketa | 726/30 |
| 8,239,836 B1* | 8/2012 | Franz et al. | 717/127 |
| 8,250,652 B1* | 8/2012 | Powell et al. | 726/22 |
| 8,307,443 B2* | 11/2012 | Wang et al. | 726/24 |
| 8,347,380 B1* | 1/2013 | Satish et al. | 726/22 |
| 8,584,005 B1* | 11/2013 | Pittenger et al. | 715/233 |
| 8,656,386 B1* | 2/2014 | Baimetov et al. | 718/1 |
| 8,683,575 B2* | 3/2014 | Meketa | 726/16 |
| 2003/0097594 A1* | 5/2003 | Penders | 713/201 |
| 2005/0149726 A1* | 7/2005 | Joshi et al. | 713/164 |
| 2006/0036570 A1* | 2/2006 | Schaefer et al. | 707/1 |
| 2006/0075381 A1* | 4/2006 | Laborczfalvi et al. | 717/100 |
| 2007/0239985 A1* | 10/2007 | Bernabeu-Auban et al. | 713/168 |
| 2008/0098006 A1* | 4/2008 | Pedersen et al. | 707/10 |
| 2008/0127125 A1* | 5/2008 | Anckaert et al. | 717/136 |
| 2008/0127348 A1* | 5/2008 | Largman et al. | 726/24 |
| 2009/0193074 A1 | 7/2009 | Lee | |
| 2009/0319432 A1* | 12/2009 | Renfro | 705/71 |
| 2010/0146615 A1* | 6/2010 | Locasto et al. | 726/11 |

FOREIGN PATENT DOCUMENTS

| | | |
|---|---|---|
| KR | 100740682 | 7/2007 |
| KR | 1020070111603 | 11/2007 |

OTHER PUBLICATIONS

Zhang, Zhiyong; Pei, Qingqi; Ma, Jianfeng; Yang, Lin; "Implementing Trustworthy Dissemination of Digital Contents by Using a Third Party Attestation Proxy-Enabling Remote Attestation Model", International Conference on MultiMedia and Information Technology, Dec. 30-31, 2008, pp. 322-325.*

* cited by examiner

APPARATUS AND METHOD FOR PREEMPTIVELY PROTECTING AGAINST MALICIOUS CODE BY SELECTIVE VIRTUALIZATION

TECHNICAL FIELD

The present invention relates to an apparatus and method for preemptively blocking a malicious code, and more particularly, to an apparatus and method for preemptively blocking a malicious code by using a selective virtualization, which virtualizes only compulsory resources required for execution of a program, and processes a request for access to another resource by generating a new resource with different content, thereby strengthening personal information protection.

BACKGROUND OF THE INVENTION

Nowadays, malicious codes multiply exponentially while they are immensely diversified by evolving into innumerous types of variants. So many websites are thus exposed to intrusions of malicious codes. The malicious codes can extract personal information with regard to games, internet banking, and the like, to thereby leak them once they succeed in intrusion. A computer with a hacking tool installed therein by a malicious code becomes a zombie computer and may be used for other malicious activities. Meanwhile, the malicious codes can conduct attacks on not only the website intruded but also users who visit the website they have attacked, in various manners such as phishing, drive-by-download or the like.

To prevent damage to users caused by such malicious codes, security programs and systems have been developed. Prevention techniques currently widely used against the drive-by-download attack include various methods such as a signature-based detection method and a preemptive prevention method.

The signature-based detection method is a technique that blocks web sites reported from users or distinguished by inspecting downloadable files by using anti-virus (AV) engines to thereby prevent them from spreading the malicious codes. In this method, samples are collected as victims of malicious code attacks report their damage afterward, or signatures capable of identifying the malicious codes are extracted via a honey pot. Therefore, the signature-based malicious code detection method has a problem that a certain number of victims are inevitably attacked before the users report attacks afterward. In other words, it is impossible to protect against a zero-day attack that takes place before the presence of security problems of a system is announced. Moreover, protection against variants of known malicious codes is not perfect, either.

The preemptive prevention method is to determine the presence of a malicious code based on the activity performed by a program. One example of this method is a technique such as host intrusion prevention system (HIPS) that protects weak points of the host system. This method cannot detect the presence of malicious codes with certainty of 100% because even though detected activities are suspicious, normal codes can conduct such activities, too. Accordingly, in this method, when a suspicious activity is detected, the user will be asked as to whether to continue to execute the corresponding code through a notification window or the like. Such a notification window frequently appears in a system protected by the preemptive prevention method to thereby make the user feel uncomfortable. Moreover, even if the notification window gives a warning about the execution of a suspicious act, it is practically difficult for ordinary users, who are not computer security experts, to be aware of the malicious code and determine whether or not to continue execution of the suspicious act.

DISCLOSURE

Technical Problem

It is, therefore, an object of the present invention to preemptively block attacks on systems by malicious codes by executing an application program and an application separately by using virtualization at the stage of intrusion from outside.

Another object of the present invention is to preemptively prevent a leak of user's personal information by using selective virtualization so that an area storing personal information of a program user cannot be seen from a separate space.

Still another object of the present invention is to effectively deal with unknown risks by comprehensively considering two or more suspicious activities executed by a vulnerable program in a separate space.

Technical Solution

In accordance with a first aspect of the present invention, there is provided an apparatus for preemptively blocking a malicious code by using selective virtualization, the apparatus including: a compulsory resource storage for selecting and storing in advance compulsory resources required for execution of a vulnerable program having an interface with an external source in a separate space; a modified resource generation unit for modifying a remaining resource other than the compulsory resources to generate a new modified resource when the vulnerable program accesses the remaining resource; and a resource control unit for performing an operating system (OS) level virtualization when the vulnerable program accesses one of the compulsory resources, and permitting the vulnerable program to access the modified resource when the vulnerable program accesses the remaining resource other than the compulsory resources.

Further, the apparatus additionally includes a vulnerable program determination unit for determining whether or not a program requested for execution is a vulnerable program.

Further, the apparatus additionally includes a vulnerable program list storage for storing a list of programs identified as using a network access resource.

Further, the resource control unit is configured to monitor activities of the vulnerable program that are conducted on a corresponding resource.

Further, the apparatus additionally includes a malicious code determination unit for comprehensively analyzing two or more suspicious activities, among the monitored activities, to determine whether or not the vulnerable program is a malicious code.

Further, the resource control unit includes one or more of a registry controller for controlling a registry resource, a file controller for controlling a file resource, a kernel object controller for controlling a kernel object resource, and a network controller for controlling a network resource.

In accordance with a second aspect of the present invention, there is provided a method for preemptively blocking a malicious code by using selective virtualization, the method including: selecting and storing in advance compulsory resources required for execution of a vulnerable program having an interface with an external source in a separate space; determining whether or not an access target of the vulnerable program is the compulsory resource; performing, if the access target is one of the compulsory resources, an operating system (OS) level virtualization; and generating, if the access target is a remaining resource other than the compulsory resources, a new modified resource by modifying content of the access target to permit the vulnerable program to access to the modified resource.

Further, the method additionally includes determining, based on a list of programs identified as using a network access resource, whether or not a program requested for execution is a vulnerable program.

Further, the method additionally includes monitoring activities of the vulnerable program performed on a corresponding resource.

Further, the method additionally includes comprehensively analyzing two or more suspicious activities among the monitored activities to determine whether the vulnerable program is a malicious code or not.

Further, said determining whether or not the access target of the vulnerable program is the compulsory resource is performed by resources basis, and the resources includes one or more of a registry, a file, a kernel object, and a network.

Further, a resource, which exists in any one of a location where the OS is installed, a location where the vulnerable program is installed, and a location which is designated by the OS such that applications are used by user account, is determined as the compulsory resource.

Further, the method additionally includes changing the rights of the vulnerable program executed in the separate space to user rights.

Advantageous Effects

In accordance with the present invention, a malicious code can be prevented beforehand from obtaining the administrator rights of a system, and the malicious code can be effectively deleted.

In addition, a leak of user's personal information or confidential information can be preemptively prevented by virtualizing only compulsory system resources required for execution of a program.

Moreover, an effect on other tasks can be minimized and unknown risks and variant malicious codes can be effectively blocked by executing a program in a separate space.

BEST MODE FOR THE INVENTION

Hereinafter, an embodiment of the present invention will be described in detail with reference to the accompanying drawings.

The intrusion of malicious code is roughly classified as either an intrusion via a network or an intrusion via recording media. The intrusion via a network occurs through a vulnerable program having an interface with an external source, such as an internet web browser, a messenger, a peer-to-peer (P2P) file sharing program, a chatting program, a mail client, a download manager, and a media player. The intrusion via recording media occurs through a universal serial bus (USB), a compact disk (CD), a floppy disk, and the like.

In many cases of malicious code intrusion, a malicious code is copied or stored in a system, and the malicious code is then given system administrator rights by a user in any possible method. The malicious code with the administrator rights can modify all resources and settings of the user system. Thus, it can deceive a prevention system or conduct malicious activities with the administrator rights. If it is possible to prevent a malicious code from obtaining the system administrator rights from the user and protect the weak points of the system, many malicious codes can be effectively blocked.

Figure 1:
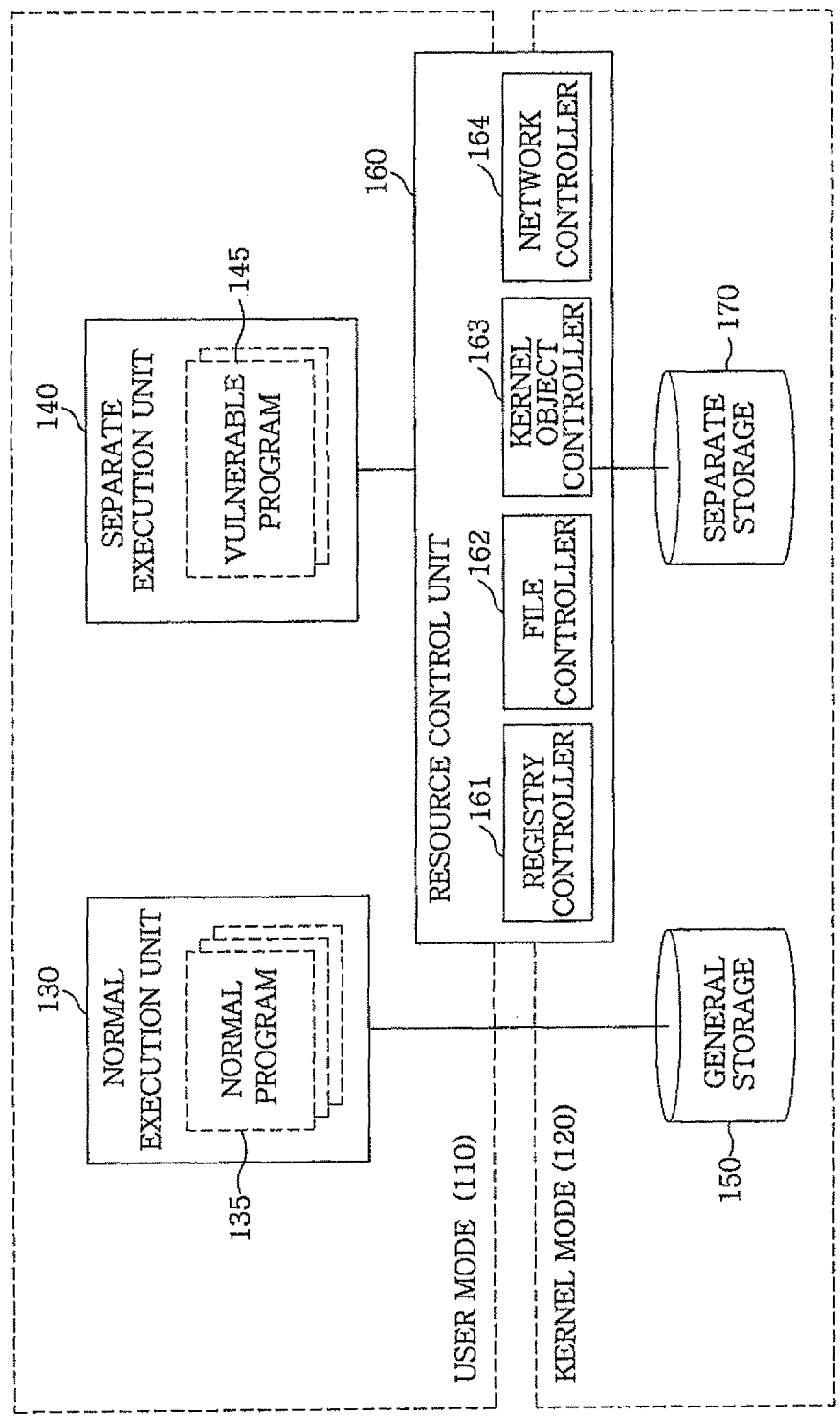
FIG. 1 illustrates a configuration of an apparatus for preemptively blocking a malicious code from the view point of a user mode and a kernel mode, in accordance with the present invention.

FIG. 1 illustrates a configuration of an apparatus for preemptively blocking a malicious code from the view points of a user mode and a kernel mode, in accordance with the present invention.

A normal program 135, which is a common application program, is executed in a normal execution unit 130, and accesses a general storage 150. However, a vulnerable program 145, which may become an intrusion path of a malicious code, is executed in a separate execution unit 140, which is an isolated space, and accesses a separate storage 170. The normal program 135 and the vulnerable program 145 are executed in a user mode 110 by the normal execution unit 130 and the separate execution unit 140, and the general storage 150 and the separate storage 170 are operated in a kernel mode 120.

The separate execution unit 140 executes a process of the vulnerable program 145 separately from the main system, such as the normal execution unit 130, by virtualizing a system source. The separate execution unit 140 controls the vulnerable program 145 to be executed, with its rights being restricted.

A resource control unit 160 controls access of the vulnerable program 145 executed in the separate execution unit 140 to the resources of the separate storage 170, and monitors the operation thereof.

If an access target of the vulnerable program 145 is a compulsory resource required for executing the program, the resource control unit 160 copes with the access by using an operating system (OS) level virtualization. Otherwise, the resource control unit 160 protects personal information by not using the virtualization. That is, unlike conventional virtualization technologies, a virtualization is selectively used depending on whether or not a target resource is compulsory. The selective virtualization will be described later in more detail.

The resource control unit 160 may include a registry controller 161, a file controller 162, a kernel object controller 163, and a network controller 164 depending on system sources. Each of the controllers 161 to 164 provides a virtualized resource when a process intends to access a corresponding system resource. Thus, the vulnerable program 145 is only accessible to the virtualized resource in a separate environment, and therefore a malicious code cannot access the host, thereby failing to gain the administrator rights of the user system.

In this case, the malicious code continuously attempts alteration of system settings, creation of a file or a registry, execution of a program, connection of a network, or the like, without being limited to any one method, in order to acquire the administrator rights. If it is possible to determine the presence of a malicious code by monitoring and analyzing the operation of the vulnerable program 145 executed in the separate execution unit 140, more effective prevention can be achieved. For example, even if an activity intended to be registered as a startup program is detected, it is not easy to determine the presence of a malicious code only based on the detection of the activity since such an activity is regularly performed by the normal program 135. However, if an irregular activity is additionally detected, such as the program arbitrarily attempting to search for and transmit a user's personal information through a network, or a program registered as the startup program intending to hide itself, two or more of these activities put together can lead to a determination of the program as a malicious code. When the program is determined to be a malicious code, the malicious code can be blocked or deleted without being affected by the alteration of system settings performed by the program.

Figure 2:
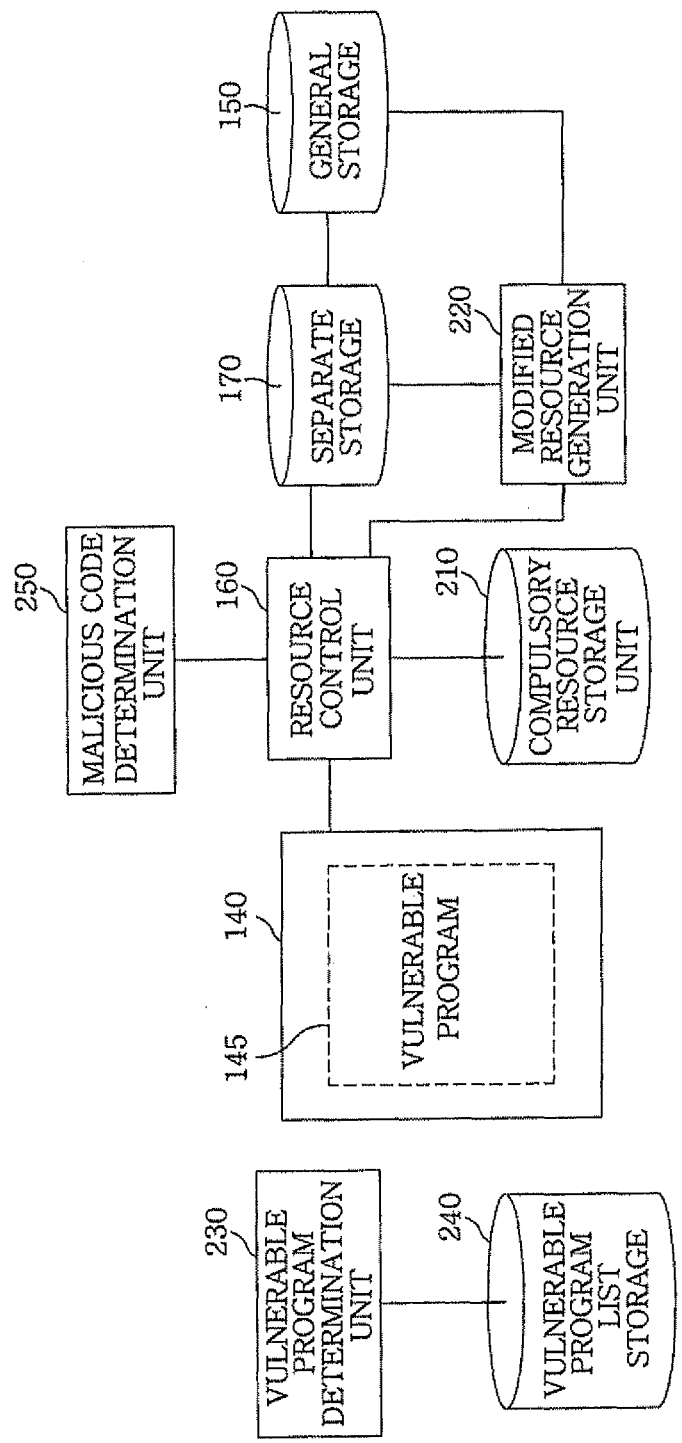
FIG. 2 is a block diagram illustrating a configuration of an apparatus for preemptively blocking a malicious code in accordance with the present invention.

FIG. 2 is a block diagram illustrating a configuration of the apparatus for blocking a malicious code in accordance with the present invention.

A vulnerable program determination unit 250 detects whether a program requested for execution is a vulnerable program or not. If it is determined that the program requested for execution is a vulnerable program, the separate execution unit 140 separates from the host the vulnerable program 145 having an interface with an external source at the point of time of an execution request. The vulnerable program may include, as described above, an Internet web browser, a messenger, a P2P file sharing program, chatting program, a mail client, a download manager, a media player, and the like. Whether a program requested for execution is the vulnerable program 145 or not is determined by the vulnerable program determination unit 230; especially, the determination can be effectively done by referring to a vulnerable program list storage 240 that manages a vulnerable program list. The vulnerable program list can be managed in such a manner that, if a program loads, installs, or uses a module controlling a network access resource when installed, this program is registered in the vulnerable program list. That is, whether to execute the program separately or not can be determined by searching the vulnerable program list when executing the program.

The resource control unit 160 implements selective virtualization in association with a compulsory resource storage 210 and a modified resource generation unit 220.

The selective virtualization means that only compulsory resources required for execution of a program are virtualized to allow an isolated space of the separate execution unit 140 to access the virtualized compulsory resources, whereas a user's personal information area is not virtualized and access thereto is restricted. The user's personal information area refers to, for example, a personal document, installation paths of other programs, an internet temporary file, and the like. If the user's personal information area which is not required for a program execution is virtualized, a malicious code can be informed of the presence or absence of a file thereof, thus causing the risk of leaking personal information.

The compulsory resource storage 210 selects compulsory resources required for execution of a program, and stores the resources or a list of the resources. The resource control unit 160 determines whether or not a resource that the vulnerable program 145 has requested to access is the compulsory resource by referring to the compulsory resource storage 210. The original data stored in the general storage 150 is copied and stored in the separate storage 170, and then the compulsory resource is virtualized to allow the vulnerable program 145 to access the copy in the separate storage 170.

Resources other than the compulsory resources include one requiring protection such as personal information, and are thus restricted from arbitrary access by the separate execution unit 140. The modified resource generation unit 220 may be used to implement the restricted arbitrary access. The modified resource generation unit 220 generates a new resource by modifying the content of another resource other than the compulsory resources stored in the general storage 150. Since the new resource, instead of the original resource, has to be executed by the vulnerable program 145 that has made an access request, it may have the same format as the original version of the remaining resources other than the compulsory resources requiring protection. In this case, the newly generated modified resource can be copied in the separate storage 170 before being accessed by the vulnerable program 145.

The malicious code determination unit 250 determines whether or not the vulnerable program is a malicious code by comprehensively analyzing two or more suspicious activities among the activities of the vulnerable program monitored by the resource control unit 160.

Figure 3:
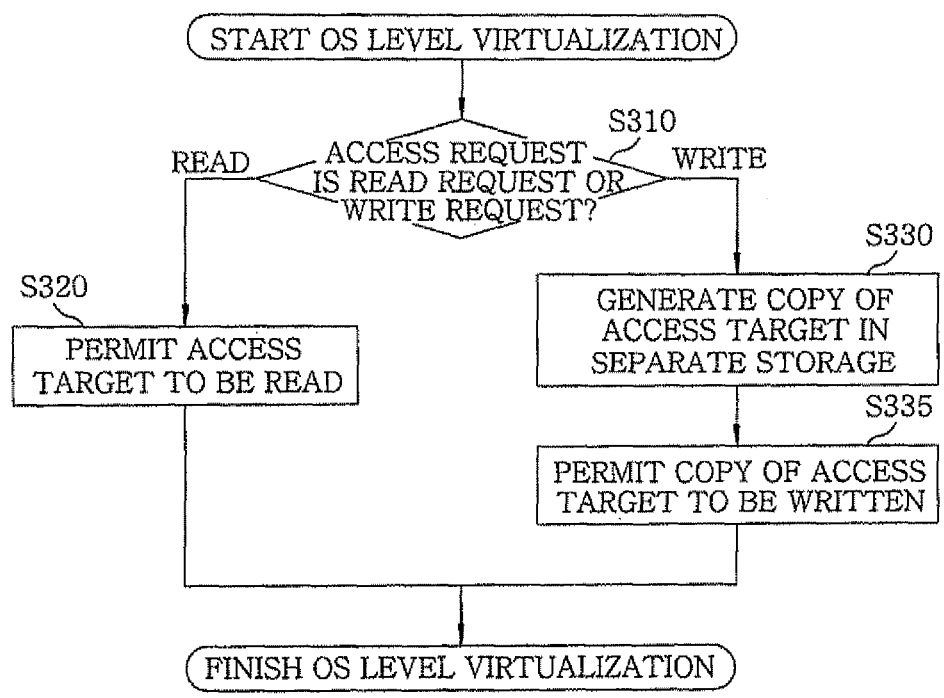
FIG. 3 illustrates one example of a process of an OS level virtualization.

FIG. 3 illustrates one example of a process of an OS level virtualization.

Virtualization refers to abstractly representing an actual resource upon a resource request. In this embodiment, an OS level virtualization is used as the virtualization technology. For example, when a program attempts to access [My Documents] folder, a request for the access to [My Documents] folder can be processed in different ways depending on its format by means of the OS level virtualization. The process of the OS level virtualization will be described below.

First, it is determined whether an access request is a Read request or a Write request in step S310. If the access request is the Read request, the request is directly accepted and an access target in the general storage 150 is permitted to be read in step S320. If the access request is the Write request, an access target file or folder is first copied to the separate storage 170 to generate a copy in step S330, and then the copy of the access target in the separate storage 170 is permitted to be written in step S335.

As described above, however, if the parts which are not required for execution of the program are virtualized altogether, there are concerns that a malicious code could be informed of the presence or absence of a file and personal information could be leaked. These problems can be solved by the selective virtualization.

Figure 4:
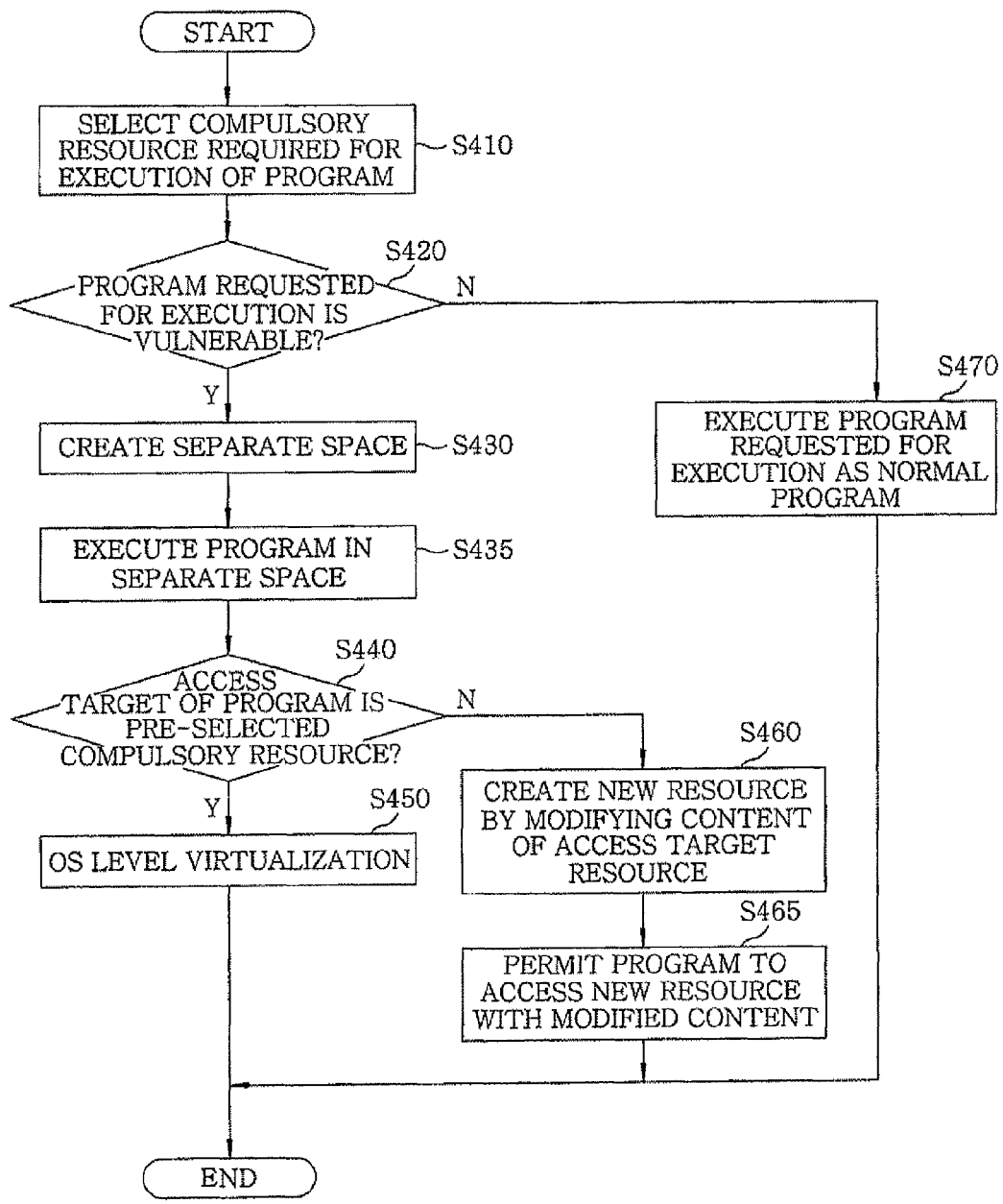
FIG. 4 is a flowchart illustrating a process of a method for preemptively blocking a malicious code in accordance with the present invention.

FIG. 4 is a flowchart illustrating a process of the method for preemptively blocking a malicious code in accordance with the present invention.

First, compulsory resources required for execution of a program are selected in advance in step S410. In common cases, an access target of a vulnerable program usually exists in a folder containing an OS installed therein, a folder containing the vulnerable program installed therein, and a location (e.g., C:\Documents and Settings\username\Application Data Folder) which is designated by the OS such that application programs and applications are used by user account. A resource present in such a specific folder may be selected in advance as a compulsory resource, depending on embodiments.

Thereafter, it is determined whether the program requested for execution is a vulnerable program or not in step S420. This is because the vulnerable program having an external interface needs to be separately executed. If the program requested for execution is determined as not being the vulnerable program, it is executed as a normal program by a common process without using virtualization in step S470. If the program requested for execution is determined as being the vulnerable program, a separate space as a virtualized environment is created in step S430, and the program concerned is then executed in the separate space in step S435.

When the vulnerable program in the separate space attempts to access a specific resource, the selective virtualization is applied to determine whether the access target is the compulsory resource that has been selected in advance in step S440. If the access target is the compulsory resource, the access is done by a common OS level virtualization technology in step S450. Resources other than the compulsory resources are not necessary parts required for execution of the program, and therefore access thereto by the vulnerable program needs to be restricted for personal information protection or the like. Accordingly, if there is a request for access to such a resource, a new resource is generated by modifying the content of the target resource in step S460, and then the program is permitted to access the new resource with the modified content in step S465. On this wise, when the vulnerable program attempts to access a compulsory resource required for its execution, the access is permitted by virtualization. Otherwise, when the vulnerable program attempts to access a resource other than the compulsory resources, a new resource is generated by modifying the content of the target resource and the program accesses to the new resource to be executed. As a result, the selective virtualization is achieved.

The modules, functional blocks or means used in the present embodiment may be implemented with a variety of known devices, such as an electronic circuit, an integrated circuit, and an application specific integrated circuit (ASIC). Also, they may be implemented separately or by integrating two or more of them.

As discussed above, even though the embodiment of the invention has been described to help understanding of the invention, the invention is not limited thereto but various modifications, changes and substitutions may be made without departing from the scope of the invention. For example, the technology of the present invention may also be applied to pictures and images that can be displayed on a display such as an LCD, instead of characters. Accordingly, all modifications and changes which are considered to be within the scope of the invention will be embraced by the following claims.

The invention claimed is:

1. An apparatus for protecting resources of a computing system from a malicious code, the apparatus comprising:
a compulsory resource storage configured to provide one or more compulsory resources or a list of the compulsory resources, wherein the compulsory resources are at least a part of the resources classified as being compulsory for execution of a program on the computing system;
a modified resource generation unit configured to generate a modified resource; and
a resource control unit configured to perform selective virtualization,
wherein the selective virtualization includes:
determining, when the program requests access to a target resource among the resources of the computing system, whether or not the access-requesting program is a vulnerable program;
when the access-requesting program is determined to not be a vulnerable program, executing the access-requesting program,
when the access-requesting program is determined to be a vulnerable program, creating a separate space for execution of the access-requesting program and further determining whether or not the target resource is one of the compulsory resources;
when the target resource is one of said compulsory resources, performing an operating system (OS) level virtualization, as follows: (a) when the access request is a read request, permitting access by the vulnerable program to the target resource, and (b) when the access request is a write request, generating a copy of the target resource and then permitting access to the copy of the target resource; and
when the target resource is not one of said compulsory resources, causing the modified resource generation unit to create a modified resource and permitting the vulnerable program to access the modified resource instead of the target resource, and
wherein the modified resource generation unit is configured to generate the modified resource such that the modified resource is a modified copy of the target resource that includes content different from that of the target resource and that is stored separately from the target resource.

2. The apparatus of claim 1, further comprising:
a vulnerable program determination unit configured to determine whether or not a program is vulnerable to a malicious code.

3. The apparatus of claim 2, further comprising:
a vulnerable program list storage which stores a list of programs identified as using a network access resource, and
wherein the vulnerable program determination unit is configured to determine whether or not the program is vulnerable to a malicious code based on a search result of the vulnerable program list storage.

4. The apparatus of claim 1, wherein the resource control unit is configured to monitor activities of the vulnerable program performed on the resources of the computing system.

5. The apparatus of claim 4, further comprising:
a malicious code determination unit configured to analyze two or more suspicious activities among the monitored activities to determine whether or not the vulnerable program includes a malicious code.

6. The apparatus of claim 1, wherein the resource control unit includes one or more of:
a registry controller configured to provide a virtualized registry;
a file controller configured to provide a virtualized file;
a kernel object controller configured to provide a virtualized kernel object; and
a network controller configured to provide a virtualized network.

7. The apparatus of claim 1, wherein the compulsory resource storage is configured to classify a resource as a compulsory resource if the resource exists in one of:
a location where the OS is installed;
a location where the vulnerable program is installed; and
a location available to an application and designated for each user account by the OS.

8. The apparatus of claim 1, wherein the modified resource generation unit is configured to generate the modified resource such that content of personal information of a user contained in the target resource is prevented from existing in the modified resource.

9. The apparatus of claim 8, wherein the personal information is one of a personal document, an installation path of a program other than the vulnerable program, and an internet temporary file.

10. The apparatus of claim 1, wherein the resource control unit is configured to perform the selective virtualization so that the target resource is prevented from being virtualized and from being provided to the vulnerable program if the target resource is other than the compulsory resources.

11. A method for protecting resources of a computing system from a malicious code, the computing system including a compulsory resource storage, a resource control unit, and a modified resource generation unit, and the method comprising:

the compulsory resource storage preparing one or more compulsory resources or a list of the compulsory resources, wherein the compulsory resources are at least a part of the resources classified as being compulsory for execution of a program on the computing system;

the resource control unit determining, when the program requests access to a target resource among the resources of the computing system, whether or not the access-requesting program is a vulnerable program, the resource control unit executing the access-requesting program if the access-requesting program is not a vulnerable program, the resource control unit creating a separate space for execution of the access-requesting program if the access-requesting program is determined to be a vulnerable program, said resource control unit then further determining whether or not the target resource is one of the compulsory resources;

the resource control unit performing, if the target resource is one of the compulsory resources, an operating system (OS) level virtualization, as follows: (a) when the access request is a read request, permitting access by the vulnerable program to the target resource, and (b) when the access request is a write request, generating a copy of the target resource and then permitting access to the copy of the target resource;

the modified resource generation unit generating, if the target resource is other than one of the compulsory resources, a modified resource, and the resource control unit permitting the vulnerable program to access the modified resource instead of the target resource, wherein the modified resource is a modified copy of the target resource that includes content different from that of the target resource and that is stored separately from the target resource.

12. The method of claim 11, further comprising:
determining whether or not a program is vulnerable to a malicious code based on a list of programs identified as using a network access resource.

13. The method of claim 11, further comprising:
monitoring activities of the vulnerable program performed on the resources of the computing system.

14. The method of claim 13, further comprising:
analyzing two or more suspicious activities among the monitored activities to determine whether or not the vulnerable program is includes a malicious code.

15. The method of claim 11, wherein said determining whether or not the target resource is one of the compulsory resources is performed by resources basis, and the resources of the computing system includes one or more of a registry, a file, a kernel object, and a network.

16. The method of claim 11, further comprising:
classifying a resource as a compulsory resource if the resource exists in one of:
a location where the OS is installed;
a location where the vulnerable program is installed; and
a location available to an application and designated for each user account by the OS.

17. The method of claim 11, further comprising:
changing a level of authority of the vulnerable program to user authority.

18. The method of claim 11, wherein said generating the modified resource performed such that content of personal information of a user contained in the target resource is prevented from existing in the modified resource.

19. The method of claim 18, wherein the personal information is one of a personal document, an installation path of a program other than the vulnerable program, and an internet temporary file.

20. The method of claim 11, wherein the virtualization is selectively performed on the compulsory resources so that the resource other than the compulsory resources is prevented from being virtualized and from being provided to the vulnerable program.

* * * * *